United States Patent
Wang et al.

(10) Patent No.: US 12,459,848 B2
(45) Date of Patent: Nov. 4, 2025

(54) HIGH TEMPERATURE AND LOW PRESSURE FINING OF SUBMERGED COMBUSTION OR OTHER GLASS

(71) Applicant: Owens-Brockway Glass Container Inc., Perrysburg, OH (US)

(72) Inventors: Zhongming Wang, Ypsilanti, MI (US); Liming Shi, Perrysburg, OH (US); Qing Jiang, Sylvania, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 87 days.

(21) Appl. No.: 18/550,319

(22) PCT Filed: Apr. 26, 2022

(86) PCT No.: PCT/US2022/026293
§ 371 (c)(1),
(2) Date: Sep. 13, 2023

(87) PCT Pub. No.: WO2022/232105
PCT Pub. Date: Nov. 3, 2022

(65) Prior Publication Data
US 2024/0300840 A1    Sep. 12, 2024

Related U.S. Application Data

(60) Provisional application No. 63/182,000, filed on Apr. 30, 2021.

(51) Int. Cl.
*C03B 5/225* (2006.01)
*C03B 5/12* (2006.01)
(Continued)

(52) U.S. Cl.
CPC ............. *C03B 5/2252* (2013.01); *C03B 5/12* (2013.01); *C03B 5/193* (2013.01); *C03B 5/235* (2013.01);
(Continued)

(58) Field of Classification Search
CPC ..... C03B 5/2252; C03B 5/262; C03B 5/2356; C03B 5/193; C03B 5/12
(Continued)

(56) References Cited

U.S. PATENT DOCUMENTS 4,704,153 A * 11/1987 Schwenninger .......... C03B 5/14
 65/129
4,738,938 A * 4/1988 Kunkle ..................... C03B 5/04
 65/129

(Continued)

FOREIGN PATENT DOCUMENTS

| DE | 202020005893 U1 * | 6/2023 | ............. C03B 5/225 |
| WO | WO-2011106605 A2 * | 9/2011 | ........... C03B 5/1875 |
| WO | 2013011835 A1 | 1/2013 | |

OTHER PUBLICATIONS

PCT International Search Report and Written Opinion, Application No. PCT/US2022/026293, Filing Date: Apr. 26, 2022, Mailed Jul. 4, 2022.

(Continued)

*Primary Examiner* — Benjamin A Schiffman (57) ABSTRACT

A method of producing glass includes discharging an outflow (22, 1022) of fined molten glass from a fining tank (18, 1018) of a vacuum induction fining apparatus (10, 1010) and delivering the fined molten glass into a thermal conditioning tank (16, 1016) that is separated from the fining tank by an open space (26, 1026) occupied by an ambient environment (24, 1024). The fining tank includes a vertically-elongated housing (80, 1080) that defines an interior fining chamber (82, 1082) where a bath (76, 1076) of molten glass is
(Continued)

collected and maintained. The interior fining chamber is maintained at subatmospheric pressure and the housing is surrounded by at least one induction coil (74, 1074) to introduce heat into the molten glass bath. The vacuum maintained in the interior fining chamber and the heating supplied by the induction coil(s) promote the ascension of gas bubbles upwards through the molten glass bath. A glass-producing system that includes the vacuum induction fining apparatus is also disclosed.

16 Claims, 5 Drawing Sheets

(51) Int. Cl.
  *C03B 5/193* (2006.01)
  *C03B 5/235* (2006.01)
  *C03B 5/26* (2006.01)
  *C03C 3/087* (2006.01)

(52) U.S. Cl.
  CPC ............ *C03B 5/2356* (2013.01); *C03B 5/262* (2013.01); *C03C 3/087* (2013.01); *C03B 2211/22* (2013.01)

(58) Field of Classification Search
  USPC .................... 65/135.6, 135.1, 134.9, 134.1
  See application file for complete search history.

(56) References Cited

U.S. PATENT DOCUMENTS

| | | | | |
|---|---|---|---|---|
| 4,780,121 A * | | 10/1988 | Matesa | C03B 5/12 65/135.1 |
| 4,780,122 A * | | 10/1988 | Schwenninger | C03B 5/20 65/346 |
| 4,792,536 A * | | 12/1988 | Pecoraro | C03B 5/04 65/32.5 |
| 4,794,860 A * | | 1/1989 | Welton | C03B 5/12 65/134.2 |
| 4,849,004 A * | | 7/1989 | Schwenninger | C03B 5/20 65/141 |
| 4,886,539 A * | | 12/1989 | Gerutti | C03C 1/004 65/134.2 |
| 4,919,700 A * | | 4/1990 | Pecoraro | C03C 1/004 65/134.2 |
| 6,119,484 A * | | 9/2000 | Takei | C03B 5/205 65/374.13 |
| 6,460,376 B1 * | | 10/2002 | Jeanvoine | C03B 5/2252 65/157 |
| 7,584,632 B2 * | | 9/2009 | House | C03B 5/225 65/29.21 |
| 8,689,586 B2 * | | 4/2014 | Hirayama | C03B 5/182 65/471 |
| 9,073,772 B2 * | | 7/2015 | Nagata | C03B 5/42 |
| 9,249,042 B2 * | | 2/2016 | Wang | C03B 5/2252 |
| 9,533,905 B2 * | | 1/2017 | Charbonneau | C03B 5/20 |
| 10,730,779 B2 * | | 8/2020 | Swiler | C03B 5/021 |
| 10,807,896 B2 * | | 10/2020 | Wang | C03C 1/004 |
| 10,858,277 B2 * | | 12/2020 | Wang | C03B 5/23 |
| 11,001,519 B2 * | | 5/2021 | Wang | C03B 5/163 |
| 11,370,686 B2 * | | 6/2022 | Wang | C03C 4/02 |
| 11,440,829 B2 * | | 9/2022 | Pinc | C03B 5/24 |
| 11,459,263 B2 * | | 10/2022 | Weil | C03B 5/2353 |
| 11,697,608 B2 * | | 7/2023 | Wang | C03C 3/078 65/134.5 |
| 12,215,861 B2 * | | 2/2025 | Shi | F23D 3/18 |
| 2008/0187686 A1 * | | 8/2008 | Rodriguez Cuartas | C03B 5/2252 65/180 |
| 2010/0251772 A1 * | | 10/2010 | Itoh | C03B 5/23 65/157 |
| 2017/0057855 A1 | | 3/2017 | Swiler et al. | |
| 2021/0017063 A1 * | | 1/2021 | Wang | C03B 5/04 |
| 2021/0292209 A1 * | | 9/2021 | Wang | C03B 5/2257 |
| 2024/0051861 A1 * | | 2/2024 | Weil | C03B 5/44 |
| 2024/0166545 A1 * | | 5/2024 | Wang | C03B 5/2252 |

OTHER PUBLICATIONS

European Office Action, Application No. 22 722 970.5-1105, Applicant: Owens-Brockway Glass Container Inc., Dated: Aug. 8, 2024.

* cited by examiner

HIGH TEMPERATURE AND LOW PRESSURE FINING OF SUBMERGED COMBUSTION OR OTHER GLASS

The present disclosure is directed to glass manufacturing and, more specifically, to techniques for fining glass produced by a submerged combustion melter or some other melting device that produces comparatively foamy molten glass.

BACKGROUND

Glass is a rigid amorphous solid that exhibits a disordered (i.e., no long range order) and spatially crosslinked oxide network. To manufacture glass, a vitrifiable feedstock material is heated to melt-react the various ingredients of the feedstock material into a flowable glassy melt having the glass chemistry needed for downstream processing into finished glass articles. The vitrifiable feedstock material typically includes glass forming ingredients along with glass network modifying ingredients and other secondary ingredients that affect glass color, glass redox, and finability of the glass. Silicate glasses such as soda-lime-silica glass, for example, include $SiO_2$ as the primary glass former and have widespread commercial applications including the manufacture of flat glass products and hollow glass containers. For silicate glasses, the vitrifiable feedstock material may include virgin raw materials such as quartz sand, soda ash, and limestone, and may further include recycled glass (i.e., cullet), glass precursor oxides in solid, liquid, or gel form, plus others not mentioned. The various materials are incorporated into the vitrifiable feedstock material in the proportions needed to produce glass with a certain chemistry and appearance.

Submerged combustion (SC) melting is a melting technology that, in theory, is a viable option for commercial glass manufacturing. Contrary to conventional glass melting practices, in which molten glass is heated primarily with radiant heat from overhead non-submerged burners, SC melting involves injecting a combustible gas mixture that contains a fuel and an oxidant directly into a glass melt contained within a SC melter housing. The combustible gas mixture is injected though submerged burners mounted in the floor or in an immersed portion of the sidewalls of a SC melter housing while the vitrifiable feedstock material is fed into the glass melt. The combustible gas mixture autoignites and the resultant combustion products cause vigorous stirring and turbulence as they are discharged through the glass melt. The intense shearing forces experienced between the combustion products and the glass melt cause rapid heat transfer and particle dissolution throughout the glass melt compared to the slower reaction kinetics of a conventional melting furnace.

While SC technology can melt the vitrifiable feedstock material into chemically homogenized molten glass relatively quickly, the direct injection of the combustible gas mixture into the glass melt—and the consequential turbulence that results therefrom—generates substantial quantities of entrained gas bubbles within the glass melt. Indeed, the glass melt produced in a SC melter is generally a volume of low-density and foamy molten glass that can include greater than 20 vol % of entrained gas bubbles. These entrained gas bubbles often need to be removed from the glass downstream of the SC melter to satisfy commercial specifications for "fined" or "bubble free" glass. The removal of gas bubbles—a process known as "fining"—may be warranted for various reasons including the visual appearance of the glass when cooled and formed into a finished commercial article such as a glass container, flat glass product, or tableware.

The challenges involved in fining molten glass discharged from an SC melter are much different than those involved in fining glass produced in a conventional melting furnace. In one respect, the bubbles contained in the glass melt of an SC melter contain different gas species than the bubbles produced in a conventional melting furnace. In SC-produced glass, the entrained gas bubbles include gas species derived from the combustion products that are fired through the glass melt as well as the decomposition of carbonates, whereas the entrained gas bubbles in conventionally-produced molten glass primarily include gas species derived from the decomposition of carbonates and other materials in the vitrifiable feedstock material. The entrained gas bubbles in SC-produced glass are also homogeneously distributed throughout the melt at a significantly higher volumetric proportion than in conventionally-produced glass. The entrained gas bubbles of SC-produced glass thus have a greater tendency to form an insulating layer of foam on top of the molten glass once the glass is allowed to settle in a downstream structure. The insulating foam layer can block the transfer of heat into the underlying molten glass, which, in turn, can slow the overall fining process by causing a drop in temperature within the deeper portions of the molten glass. Still further, the addition of chemical fining agents into the SC melter is also a complex endeavor since the direct firing of combustion gasses through the glass melt may result in excessive volatilization of the fining agents and/or unwanted chemical side reactions.

Considering the operational differences between submerged combustion melting and conventional glass melting, and the impact each of those melting processes has on the resultant glass produced therefrom in terms of bubble generation, it should not be surprising that fining techniques developed for conventionally-melted glass may not be well adapted for fining SC-produced glass. In many instances, if conventional fining techniques are employed to fine SC-produced glass, including adding the SC-produced glass into a separate vessel and heating the glass with overhead burners and/or submerged electrodes, the residence time required to adequately fine the glass is simply too high. Glass fining practices that are more tailored to SC-produced glass are therefore needed to help implement SC glass melting, or some other melting technology that produces comparatively foamy molten glass, in a commercial setting where production standards that specify a certain quality of glass with regards to bubble content need to be consistently met.

SUMMARY OF THE DISCLOSURE

The present disclosure relates to a fining apparatus, a glass producing system that includes the fining apparatus, and a method for fining SC-produced glass or other comparatively foamy molten glass. The fining apparatus is a vacuum induction fining apparatus that includes a fining tank. The fining tank receives an inflow of unfined molten glass and discharges an outflow of fined molten glass. The unfined molten glass comprises at least 20 vol %, and typically between 30 vol % and 60 vol %, of entrained gas bubbles, and is preferably produced by a submerged combustion melter. The fined molten glass comprises fewer bubbles on a volume percentage basis and has a greater density than the unfined molten glass. The exact specification for how fined the molten glass needs to be depends on the standard or specification that defines a bubble content required for a particular end-product. For instance, in the glassware and flat glass industries, the fined molten glass may have a bubble count of zero blisters (bubbles having diameters of 0.8 mm or greater) and 0.5 seeds (bubbles having diameters less than 0.8 mm) per gram of glass or less.

The fining tank has a vertically-elongated housing that defines an interior fining chamber where a bath of molten glass is collected and maintained. The interior fining chamber is maintained at subatmospheric pressure and the housing is surrounded by at least one induction coil to introduce heat into the molten glass bath. The vacuum maintained in the interior fining chamber and the heating supplied by the induction coil(s) promote the ascension of gas bubbles upwards through the molten glass bath until the bubbles eventually reach a top surface of the glass bath and burst. To help attain suitably fined molten glass for discharge from the fining tank, a height of the housing is greater than a width of the housing so that the higher-density fined glass has more space to sink and gravitationally separate within the molten glass bath from the lower-density unfined glass. An outflow of fined molten glass is discharged from the fining tank of the fining apparatus in one or more streams. The outflow of fined molten glass is delivered to a thermal conditioning tank while being exposed to an ambient environment, which quickly cools the glass, as the glass falls freely from the fining tank to the thermal conditioning tank. This rapid intermittent cooling of the fined molten glass reduces the residence time needed for thermal conditioning within the thermal conditioning tank.

The vacuum induction approach to fining low-density, foamy molten glass in an upright fining tank combined with rapid intermittent cooling of the fined molten glass in the ambient environment before the glass enters the thermal conditioning tank enables both the fining process and the conditioning process to proceed more quickly compared to conventional fining and thermal conditioning approaches. The fining tank and the thermal conditioning tank can thus be smaller in size compared to conventional tank structures while maintaining serviceable throughput, which, in turn, allows the overall glass-producing system to be compacted into a smaller industrial footprint. The smaller size of the fining tank and the thermal conditioning tank also facilitates operational flexibility since the tanks can be more easily shut down, emptied, and restarted when needed within reasonable time periods that simply cannot be matched in a glass-producing system that includes a conventional glass melting furnace.

The present disclosure embodies a number of aspects that can be implemented separately from or in combination with each other to provide a method for producing glass. According to one embodiment of the present disclosure, a method of producing glass includes several steps. One step of the method involves producing a volume of unfined molten glass that comprises at least 20 vol % of entrained gas bubbles. Another step of the method involves receiving an inflow of unfined molten glass from the volume of unfined molten glass and introducing the inflow of unfined molten glass into a fining tank that holds a molten glass bath. The fining tank has a housing that defines an interior fining chamber in which the molten glass bath is contained. The housing of the fining tank has a height and a width, with the height of the housing being greater than the width of the housing. Moreover, the inflow of unfined molten glass combines with the molten glass bath in the interior fining chamber of the fining tank. Still another step of the method involves maintaining the interior fining chamber of the fining tank at a subatmospheric pressure. Yet another step of the method involves inductively heating the molten glass bath contained within the fining tank to maintain the molten glass bath within a temperature range for glass fining. Another step of the method involves discharging an outflow of fined molten glass from the fining tank. The outflow of fined molten glass is drawn from the molten glass bath and has a lower volume percentage of entrained gas bubbles and a higher density than the inflow of unfined molten glass received into the fining tank.

Still another step of the method involves passing the outflow of fined molten glass through an ambient environment as the outflow of fined molten glass falls from the fining tank into a thermal conditioning tank through an open space that separates the fining tank and the thermal conditioning tank. The outflow of fined molten glass cools down when exposed to the ambient environment. Another step of the method involves introducing the outflow of fined molten glass into the thermal conditioning tank in which the outflow of fined molten glass combines with a flowing molten glass bath held within a conditioning chamber of the thermal conditioning tank. Yet another step of the method involves discharging an output of conditioned molten glass from the thermal conditioning tank. The output of conditioned molten glass has a temperature that is less than a temperature of the outflow of fined molten glass introduced into the thermal conditioning tank.

According to another aspect of the present disclosure, a method of producing glass includes several steps. One step of the method involves producing a volume of unfined molten glass in a submerged combustion melter which includes discharging combustion products from one or more submerged burners directly into a glass melt held within an interior reaction chamber of the submerged combustion melter. Another step of the method involves receiving an inflow of unfined molten glass from the submerged combustion melter and introducing the inflow of unfined molten glass into a fining tank that holds a molten glass bath having a depth. The fining tank has a vertically-elongated housing that defines an interior fining chamber in which the molten glass bath is contained. The housing of the fining tank has a height and a width, with the height of the housing being greater than the width of the housing. Moreover, the inflow of unfined molten glass combines with the molten glass bath in the interior fining chamber of the fining tank. Still another step of the method involves maintaining the interior fining chamber of the fining tank at a subatmospheric pressure. Yet another step of the method involves inductively heating the molten glass bath contained within the fining tank to maintain the molten glass bath at a temperature ranging from 1250° C. to 1650° C. Another step of the method involves discharging an outflow of fined molten glass from the fining tank. The outflow of fined molten glass is drawn from the molten glass bath and has a lower volume percentage of entrained gas bubbles and a higher density than the inflow of unfined molten glass received into the fining tank. Additionally, the outflow of fined molten glass is in the form of a plurality of discrete streams of fined molten glass. Still another step of the method involves passing the outflow of fined molten glass through an ambient environment as the outflow of fined molten glass falls from the fining tank into a thermal conditioning tank through an open space that separates the fining tank and the thermal conditioning tank. The outflow of fined molten glass cools down when exposed to the ambient environment. Yet another step of the method involves introducing the outflow of fined molten glass into the thermal conditioning tank in which the outflow of fined molten glass combines with a flowing molten glass bath held within a conditioning chamber of the thermal conditioning tank.

According to yet another aspect of the present disclosure, a glass-producing system includes a fining apparatus and a thermal conditioning tank. The fining apparatus is positioned to fine unfined molten glass comprising at least 20 vol % of entrained gas bubbles. The fining apparatus includes a fining tank configured to receive an inflow of unfined molten glass. The fining tank has a vertically-elongated housing that defines an interior fining chamber. The vertically-elongated housing has a height and a width, with the height of the vertically-elongated housing being greater than the width of the vertically-elongated housing. The vertically-elongated housing further defines an outlet configured to discharge an outflow of fined molten glass from the fining tank. In addition to the fining tank, the fining apparatus also includes a vacuum source in fluid communication with the interior fining chamber of the fining tank and configured to maintain the interior fining chamber at a subatmospheric pressure. Still further, the fining apparatus includes one or more induction heating coils surrounding the interior fining chamber of the fining tank. The thermal conditioning tank of the glass-producing system is separated from the fining tank by an open space occupied by an ambient environment. The thermal conditioning tank has a housing that defines an inlet to a conditioning chamber. The outlet of the housing of the fining tank is configured to discharge the outflow of fined molten glass so that the outflow of fined molten glass falls freely from the outlet of the housing of the fining tank, through the ambient environment, and into the conditioning chamber through the inlet of the housing of the thermal conditioning tank.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

Figure 1:
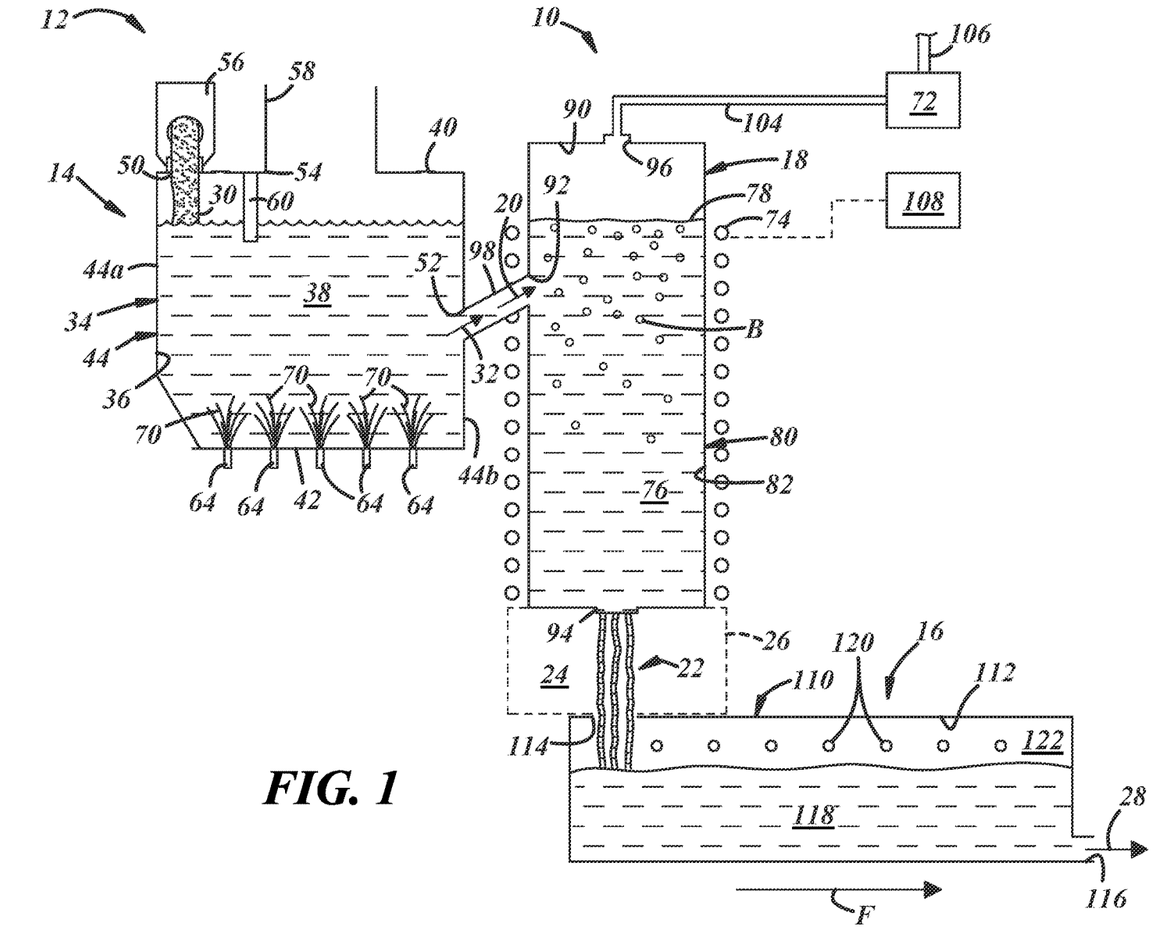
FIG. 1 is an elevated cross-sectional representation of a glass-producing system that includes a submerged combustion melter, a fining apparatus that includes a vacuum induction fining tank, and a thermal conditioning tank according to one embodiment of the present disclosure.

A fining apparatus 10 is shown in FIG. 1 according to one embodiment of the present disclosure in the context of a glass-producing system 12 that also includes a submerged combustion (SC) melter 14 and a thermal conditioning tank 16. The fining apparatus 10 includes a fining tank 18 that is inductively heated and operates at a subatmospheric pressure. The fining tank 18 receives an inflow 20 of unfined molten glass from the SC melter 14 and discharges an outflow 22 of fined molten glass for delivery to the thermal conditioning tank 16 through an ambient environment 24 located within an open space 26 between the fining tank 18 and the thermal conditioning tank 16. The thermal conditioning tank 16 conditions the fined molten glass received from the fining tank 18—that is, the molten glass is thermally homogenized—and supplies an output 28 of conditioned molten glass for forming into a glass article such as, for example, a hollow container (e.g., a bottle or jar) or a sheet of flat glass.

The fining apparatus 10 and its operation are designed to help eradicate entrained gas bubbles from the low-density and foamy unfined molten glass produced in the SC melter 14 as quickly as possible while at the same time lowering the burden on the thermal conditioning tank 16 by enabling intermittent cooling of the fined molten glass prior to the glass entering the thermal conditioning tank 16. These operational gains render the overall glass-producing system 12 more energy efficient while permitting the system to be condensed in size, most notably the fining tank 18 and the thermal conditioning tank 16, without necessarily reducing the throughput of conditioned molten glass. While the glass-producing system 12 depicted in FIG. 1 and described below employs the SC melter 14 as the source of the unfined molten glass, it should be appreciated that the source of the unfined molten glass may be something other than the SC melter 14 provided that the glass is comparable in terms of density and volumetric bubble content.

Figure 2:
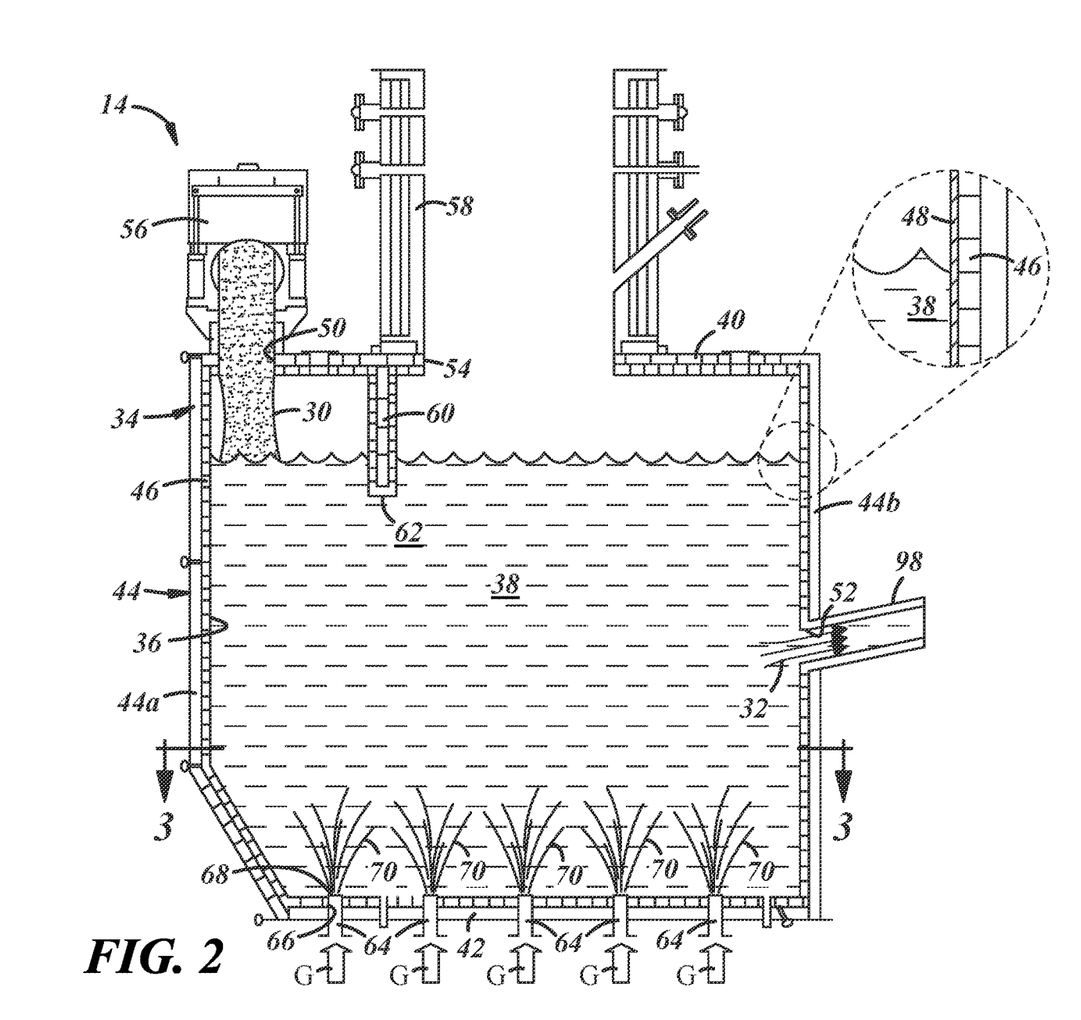
FIG. 2 is an elevated cross-sectional view of a representative submerged combustion melter for use in the glass-producing system illustrated in FIG. 1 according to one embodiment of the present disclosure.
Figure 3:
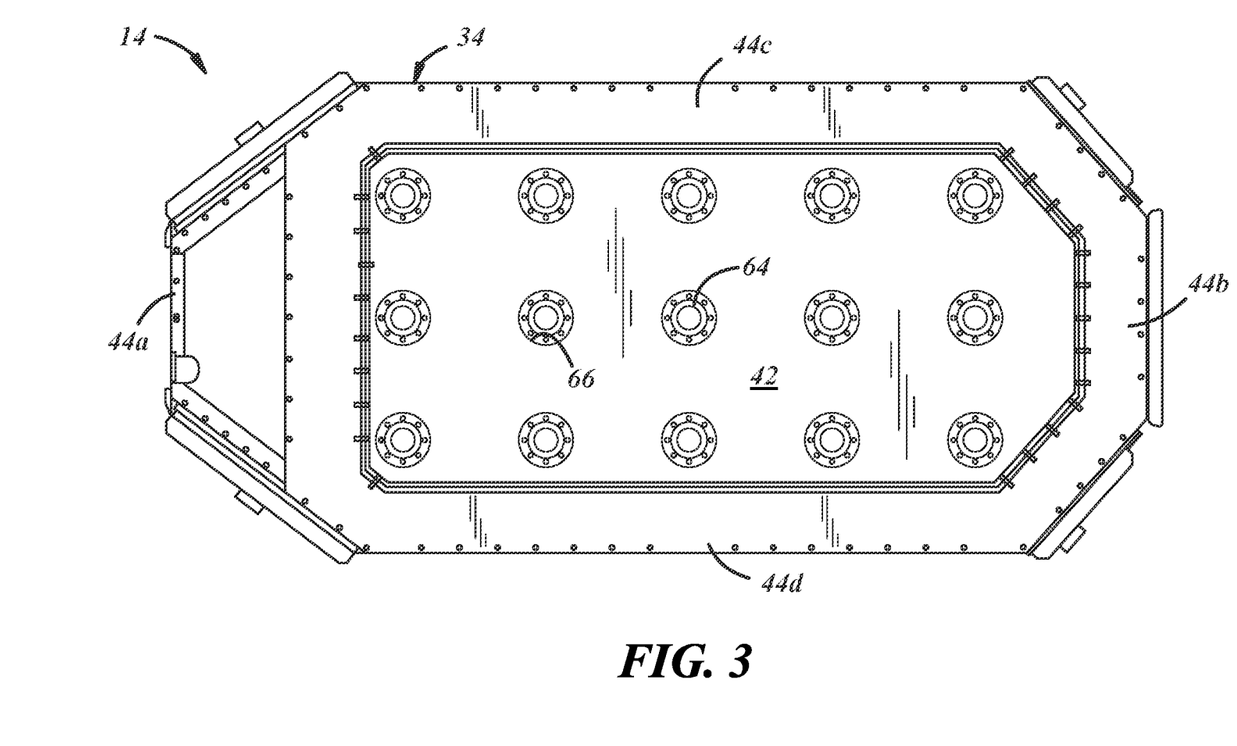
FIG. 3 is a cross-sectional view of the submerged combustion melter illustrated in FIG. 2 taken along section line 3-3.

The SC melter 14 vitrifies a vitrifiable feedstock material 30 and discharges a supply of unfined molten glass 32. Referring now to FIGS. 2-3, the SC melter 14 includes a housing 34 that defines an interior reaction chamber 36. The interior reaction chamber 36 holds and contains an agitated glass melt 38 that provides a requisite residence time for the vitrifiable feedstock material 30 to melt-react into the unfined molten glass. The housing 34 has a roof 40, a floor 42, and a surrounding upstanding wall 44 that connects the roof 40 and the floor 42. The surrounding upstanding wall 44 further includes a front-end wall 44a, a rear-end wall 44b that opposes and is spaced apart from the front-end wall 44a, and two opposed lateral sidewalls 44c, 44d that connect the front-end wall 44a and the rear-end wall 44b. At least the floor 42 and the upstanding side wall 44 of the housing 34, as well as the roof 40 if desired, may be constructed from one or more fluid cooled panels. Each of the fluid cooled panels defines an internal cooling space through which a coolant, such as water, may be circulated to cool the housing 34. As a result of being fluid cooled, a glass-side refractory material layer 46 covering a surface of each liquid cooled panel supports, and is covered by, a layer of frozen glass 48 that forms in-situ between an outer skin of the glass melt 38 and a surface of the glass-side refractory material layer 46. The glass-side refractory material layer 46 may be composed of AZS (i.e., alumina-zirconia-silica). In other embodiments, the housing 34 may be formed of dual metal walls that lack the glass-side refractory material layer 46.

The housing 34 of the SC melter 14 defines a feed material inlet 50, a molten glass outlet 52, and an exhaust vent 54. As shown here in FIG. 2, the feed material inlet 50 may be defined in the roof 40 of the housing 34 adjacent to or a distance from the front-end wall 44a, and the molten glass outlet 52 may be defined in the rear-end wall 44b of the housing 34 adjacent to or a distance above the floor 42, although other locations for the feed material inlet 50 and the molten glass outlet 52 are certainly possible. The feed material inlet 50 provides an entrance to the interior reaction chamber 36 for the delivery of the vitrifiable feedstock material 30. A batch feeder 56 that is configured to introduce a metered amount of the vitrifiable feedstock material 30 into the interior reaction chamber 36 may be coupled to the housing 34. The batch feeder 56 may, for example, include a rotating screw (not shown) that rotates within a feed tube of a slightly larger diameter that communicates with the feed material inlet 50 to deliver the vitrifiable feedstock material 30 into the interior reaction chamber 36 at a controlled rate. The molten glass outlet 52 provides an exit from the interior reaction chamber 36 for the discharge of the supplied unfined molten glass 32, which is pulled from the glass melt 38, out of the SC melter 14.

The exhaust vent 54 is preferably defined in the roof 40 of the housing 34 between the front-end wall 44a and the rear-end wall 44b at a location downstream from the feed material inlet 50. An exhaust duct 58 communicates with the exhaust vent 54 and is configured to remove gaseous compounds from the interior reaction chamber 36. The gaseous compounds removed through the exhaust duct 58 may be treated, recycled, or otherwise managed away from the SC melter 14 as needed. To help prevent or at least minimize the potential loss of some of the vitrifiable feedstock material 30 through the exhaust vent 58 as unintentional feedstock material castoff, a partition wall 60 that depends from the roof 40 of the housing 34 may be positioned between the feed material inlet 50 and the exhaust vent 54. The partition wall 60 may include a lower free end 62 that is submerged within the glass melt 38, as shown, although it may also be positioned close to, but above, the glass melt 38 in other implementations. Preferably, the partition wall 60 is constructed from a fluid-cooled panel similar to those that may be used to construct at least a portion of the housing 34.

The SC melter 14 includes one or more submerged burners 64. Each of the one or more submerged burners 64 is mounted in a port 66 defined in the floor 42 (as shown) and/or the surrounding upstanding wall 44 at a portion of the wall 44 that is immersed by the glass melt 38. Each of the submerged burner(s) 64 forcibly injects a combustible gas mixture G into the glass melt 38 through an output nozzle 68. The combustible gas mixture G comprises a fuel and an oxidant. The fuel supplied to the submerged burner(s) 64 is preferably methane or propane, and the oxidant is preferably pure oxygen (≥99 vol % $O_2$) or an oxygen-enriched gas that includes a high percentage (≥80 vol %) of oxygen, in which case the burner(s) 64 are oxy-fuel burners, or it may be air. Upon being injected into the glass melt 38, the combustible gas mixture G immediately autoignites to produce combustion products 70—namely, $CO_2$, CO, $H_2O$, and any uncombusted fuel, oxygen, and/or other gas compounds such as nitrogen—that are discharged into and through the glass melt 38. Anywhere from five to thirty submerged burners 64 are typically installed in the SC melter 14 although more or less burners 64 may certainly be employed depending on the size and melt capacity of the melter 14. Each of the submerged burner(s) 64 may be fluidly coupled to a fuel manifold and an oxidant manifold by a flow conduit that is equipped with sensors and valves to allow for precise control of the flow rates of the fuel and oxidant to the burner(s) 64 in the correct ratio. Alternatively, each of the submerged burner(s) 64 may be fluidly coupled to a mixing tank in which the fuel and oxidant are pre-mixed.

The vitrifiable feedstock material 30 that is fed to the SC melter 14 may be formulated to produce, upon melt-reaction within the agitated glass melt 38, any type of glass, including various silicate glasses, with a specified glass chemistry. Soda-lime-silica glass, for example, is used extensively to manufacture flat glass articles including windows, hollow glass articles including containers such as bottles and jars, and also tableware and other specialty articles. Soda-lime-silica glass comprises a disordered and spatially crosslinked ternary oxide network of $SiO_2$—$Na_2O$—CaO. The silica component ($SiO_2$) is the largest oxide by weight and constitutes the primary network forming material of soda-lime-silica glass. The $Na_2O$ component functions as a fluxing agent that reduces the melting, softening, and glass transition temperatures of the glass, as compared to pure silica glass, and the CaO component functions as a stabilizer that improves certain physical and chemical properties of the glass including its hardness and chemical resistance. Soda-lime-silica glass, in general and based on the total weight of the glass, has a glass chemical composition that includes 60 wt % to 80 wt % $SiO_2$, 8 wt % to 18 wt % $Na_2O$, and 5 wt % to 15 wt % CaO.

In addition to $SiO_2$, $Na_2O$, and CaO, the glass chemical composition of soda-lime-silica glass may include other oxide and non-oxide materials that act as network formers, intermediate formers, network modifiers, colorants, decolorants, redox agents, or other agents that affect the properties of the final glass. Some examples of these additional materials include aluminum oxide ($Al_2O_3$), magnesium oxide (MgO), potassium oxide ($K_2O$), carbon, sulfates, nitrates, fluorines, chlorines, and/or elemental or oxide forms of one or more of iron, arsenic, antimony, selenium, chromium, barium, manganese, cobalt, nickel, sulfur, vanadium, titanium, lead, copper, niobium, molybdenum, lithium, silver, strontium, cadmium, indium, tin, gold, cerium, praseodymium, neodymium, europium, gadolinium, erbium, and uranium. Aluminum oxide is one of the more commonly included materials—typically present in an amount up to 2 wt % based on the total weight of the glass—because of its ability to improve the chemical durability of the glass and to reduce the likelihood of devitrification. Regardless of what other oxide and/or non-oxide materials are present in the soda-lime-glass besides $SiO_2$, $Na_2O$, and CaO, the sum total of those additional materials is preferably 10 wt % or less, or more narrowly 5 wt % or less, based on the total weight of the soda-lime-silica glass.

To produce soda-lime-silica glass having a soda-lime-silica glass chemical composition, the vitrifiable feedstock material 30 may be a physical mixture of virgin raw materials and optionally cullet (i.e., recycled glass) and/or other glass precursor oxides that provides a source of $SiO_2$, $Na_2O$, and CaO in the correct proportions along with any of the other components of the glass listed below in Table 1 including, most commonly, $Al_2O_3$. For example, the vitrifiable feedstock material 30 may include raw materials such as quartz sand (crystalline $SiO_2$), soda ash ($Na_2CO_3$), and limestone ($CaCO_3$) in the quantities needed to provide the requisite proportions of $SiO_2$, $Na_2O$, and CaO, respectively. Other raw materials may also be included in the vitrifiable feedstock material 30 to contribute one or more of $SiO_2$, $Na_2O$, CaO, and possibly other oxide and/or non-oxide materials depending on the desired chemistry of the soda-lime-silica glass chemical composition and the color of the glass articles being formed. These other virgin raw materials may include feldspar, dolomite, and calumite slag. The vitrifiable feedstock material 30 may include up to 80 wt % cullet depending on a variety of factors. Additionally, the vitrifiable feedstock material 30 may include secondary materials that provide the soda-lime-silica glass chemical composition with colorants, decolorants, and/or redox agents, and in some instances may include chemical fining agents. Of course, the exact formulation of the vitrifiable feedstock material 30 is subject to variation while still being able to achieve the soda-lime-silica glass chemical composition as is generally well known in the glass manufacturing industry.

TABLE 1

Glass Chemical Composition of Soda-Lime-Silica Glass

| Component | Weight % | Raw Material Sources |
|---|---|---|
| $SiO_2$ | 60-80 | Quartz sand |
| $Na_2O$ | 8-18 | Soda ash |
| CaO | 5-15 | Limestone |
| $Al_2O_3$ | 0-2 | Nepheline Syenite, Feldspar |
| MgO | 0-5 | Magnesite |
| $K_2O$ | 0-3 | Potash |
| $Fe_2O_3$ + FeO | 0-0.08 | Iron is a contaminant |
| $MnO_2$ | 0-0.3 | Manganese Dioxide |
| $SO_3$ | 0-0.5 | Salt Cake, Slag |
| Se | 0-0.0005 | Selenium |
| F | 0-0.5 | Fluorines are a contaminant |

The fining apparatus 10 is positioned to receive and fine the unfined molten glass discharged from the SC melter 14, and to supply fined molten glass to the thermal conditioning tank 16. In that regard, the fining apparatus 10 is positioned between the SC melter 14 and the thermal conditioning tank 16 in terms of the direction of molten glass flow through the glass-producing system 12. The fining apparatus 10 includes the fining tank 18, a vacuum source 72, and one or more induction heating coils 74. The fining tank 18 holds a bath 76 of molten glass into which the inflow 20 of unfined molten glass is introduced and from which the outflow 22 of fined molten glass is removed. The unfined molten glass and the fined molten glass gravitationally separate within the molten glass bath 76 as entrained gas bubbles B included in the glass bath 76 rise to a top surface 78 of the glass bath 76 and burst. The ascension of the gas bubbles B upwards through the molten glass bath 76 is assisted by the vacuum source 72 and the induction heating coil(s) 74, which together help increase the velocity at which the gas bubbles B rise through the viscous glass bath 76.

Figure 4:
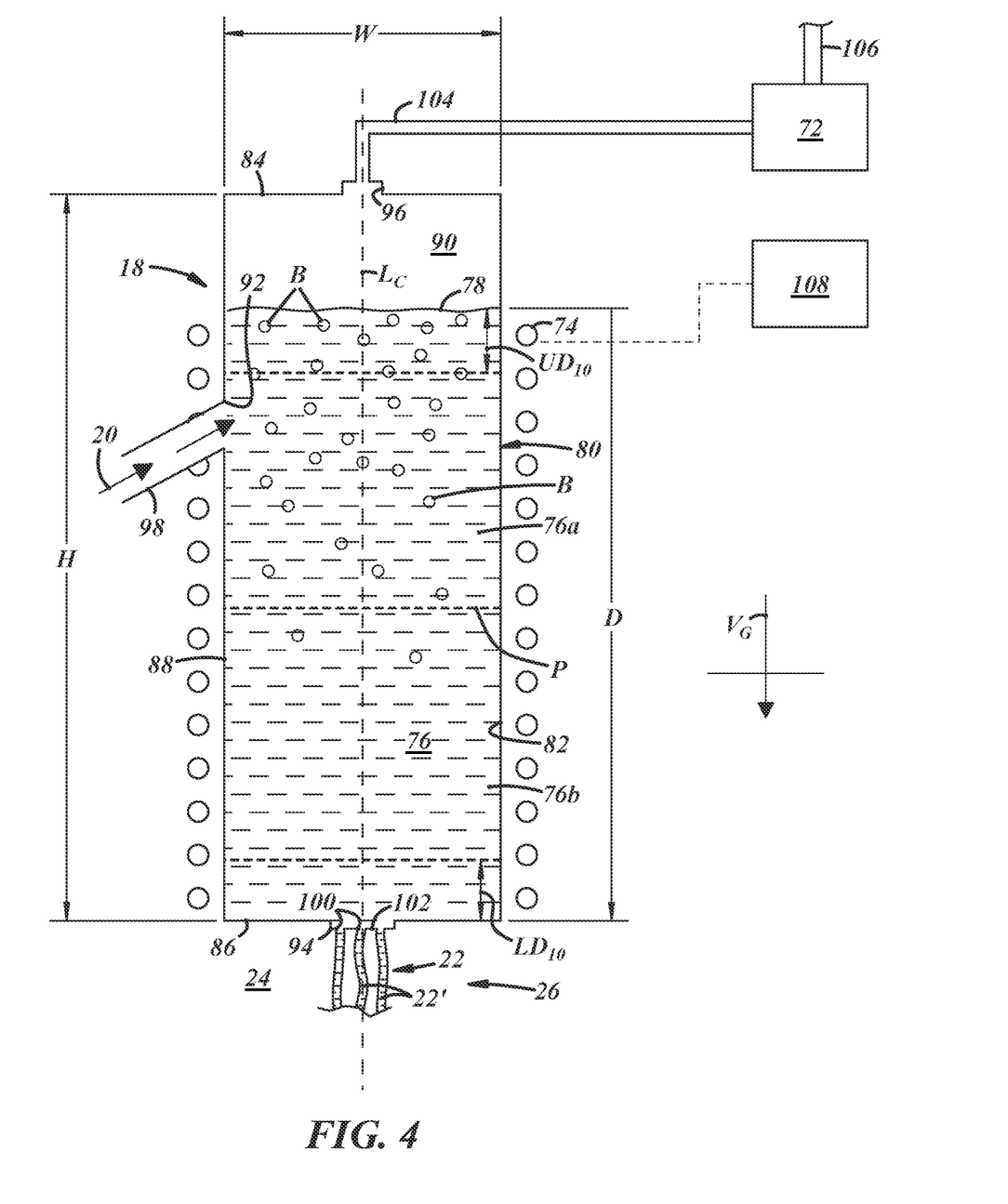
FIG. 4 is a magnified elevational cross-sectional view of the fining apparatus included in the glass-producing system of FIG. 1.

Referring now to FIGS. 1 and 4, the fining tank 18 includes a vertically-elongated housing 80 that defines an interior fining chamber 82. The housing 80 of the fining tank 18 has a top wall 84, a bottom wall 86, and a tubular sidewall 88 extending between the top wall 84 and the bottom wall 86. The maximum distance between the top wall 84 and the bottom wall 86 as measured through the interior fining chamber 82 parallel to a long centerline $L_C$ of the housing 80 defines a height H of the housing 80, and the maximum distance between opposed portions of the tubular sidewall 88 as measured through the interior fining chamber 82 perpendicular to the long centerline $L_C$ defines a width W of the housing 80. The tubular sidewall 88 may be cylindrical, in which case the sidewall 88 has a circular cross-sectional profile when sectioned along the width W of the housing 80 and viewed down the long centerline $L_C$, or it may assume some other shape including a rectangular cuboid, in which case the sidewall 88 has a square or rectangular cross-sectional profile when sectioned and viewed in the same way. The molten glass bath 76 is held within the interior fining chamber 82 of the housing 80, but does not fully occupy the fining chamber 82, as a head space 90 of the chamber 82 is present above the top surface 78 of the molten glass bath 76. To help withstand the high-temperature and corrosive nature of the molten glass bath 76, each of the top wall 84, the bottom wall 86, and the tubular sidewall 88 may be constructed from a refractory material such as fuse cast AZS, bond AZS, or castable AZS, to name but a few available options.

The housing 80 is considered vertically-elongated when the height H of the housing 80 is greater than the width W of the housing 80 by a factor of at least three. Indeed, in one implementation, a ratio of the height H of the housing 80 to the width W of the housing 80 preferably ranges from 3:1 to 15:1 or more narrowly from 6:1 to 10:1. Additionally, and as shown in FIG. 4, the long centerline $L_C$ (and thus the measurement of height H) of the housing 80 may be aligned parallel to a gravity vector $V_G$, although the long centerline $L_C$ of the housing 80 may be offset from the gravity vector $V_G$ (i.e., the vertically-elongated housing 80 is tilted) by up to 45° in any direction. The housing 80 of the fining tank 18 is vertically-elongated to provide enough space for the entrained gas bubbles B to rise, and fined molten glass to sink, within the molten glass bath 76 so that fined molten glass which meets specifications for density and/or bubble count collects adjacent to the bottom wall 86 of the housing 80. Typically, a depth D of the molten glass bath 76, which is the maximum distance between the top surface 78 of the glass bath 76 and the bottom wall 86 of the housing 80 as measured parallel to the long centerline $L_C$ of the housing 80, ranges from 60% to 95%, or more narrowly from 70% to 80%, of the height H of the housing 80. This depth envelope helps maximize the gravitational separating capacity of the molten glass bath 76 while leaving an adequate volume of the head space 90 above the glass bath 76 to accommodate bursting gas bubbles.

The housing 80 of the fining tank 18 defines an inlet 92, an outlet 94, and a vacuum port 96. The inlet 92 receives the inflow 20 of unfined molten glass from the SC melter 14. The inlet 92 is preferably defined in the tubular sidewall 88 of the housing 80 at a location that is immersed by the molten glass bath 76 so that the inflow 20 of unfined molten glass is introduced directly into the glass bath 76. In particular, and in one implementation, the inlet 92 is defined at an immersed location of the tubular sidewall 88 that is positioned closer to the top surface 78 of the molten glass bath 76 than the bottom wall 86 of the housing 80 and above a centerplane P oriented perpendicular to the long centerline $L_C$ that bisects the molten glass bath 76 into an upper half 76a and a lower half 76b. By introducing the inflow 20 of unfined molten glass into the upper half 76a of the molten glass bath 76, the entrained gas bubbles B simultaneously added into the molten glass bath 76 will generally be kept away from the fined molten glass in the lower half 76b of the molten glass bath 76. The inlet 92 to the housing 80 of the fining tank 18 may be fluidly connected directly to the molten glass outlet 52 of the SC melter 14 by a glass delivery conduit 98 so that the supply of unfined molten glass 32 discharged from the interior reaction chamber 36 of the SC melter 14 and the inflow 20 of unfined molten glass delivered into the fining tank 18 are the same continuous stream or flow. In an alternate embodiment, the glass delivery conduit 98 may be interrupted by an intermediate holding tank (not shown) to help settle and moderate the flow rate of the inflow 20 of unfined molten glass into the fining tank 18, in which case the supply of unfined molten glass 32 discharged from the interior reaction chamber 36 of the SC melter 14 and the inflow 20 of unfined molten glass into the fining tank 18 are not the same continuous stream and, thus, may have different flow characteristics.

The outlet 94 of the housing 80 discharges the outflow 22 of fined molten glass from the fining tank 18. The outlet 94 is preferably defined in the bottom wall 86 of the housing 80 or in the tubular sidewall 88 of the housing 80 at a location that is immersed by the lower half 76b of the molten glass bath 76. Ordinarily, if the outlet 94 is defined in the tubular sidewall 88, the outlet 94 is located no more than 25% of the depth D of the glass bath 76 above the bottom wall 86 of the housing 80 in order to remove the glass from the zone of the molten glass bath 76 that is most dense. The outlet 94 includes one or more, and preferably anywhere from one to five, discharge openings 100 defined in an orifice plate 102. The outflow 22 of fined molten glass is discharged through the discharge opening(s) 100 as streams or runners 22' of fined molten glass; that is, the outflow 22 of fined molten glass is supplied as one or more streams 22' of fined molten glass with each stream 22' being discharged through a corresponding discharge opening 100 of the orifice plate 102. Upon being discharged from the outlet 94, the outflow 22 of fined molten glass falls through the open space 26 between the fining tank 18 and the thermal conditioning tank 16 and is exposed to the ambient environment 24 in the process.

The vacuum port 96 is defined in the top wall 84 of the housing 80 or the tubular sidewall 88 at a location that is not immersed by the molten glass bath 76. In this way, the vacuum port 96 fluidly communicates with the head space 90 of the interior fining chamber 82 that is present above the molten glass bath 76 at the top of the fining tank 18. The vacuum port 96 is connected to a vacuum conduit 104 which, in turn, is connected to the vacuum source 72. The vacuum source 72 is preferably a vacuum pump such as a positive displacement pump or a momentum transfer pump. The vacuum source 72 operates to reduce the pressure within the interior fining chamber 82 and, more specifically, the head space 90 of the fining chamber 82, to a subatmospheric level. For instance, the absolute pressure within the interior fining chamber 82 may be reduced to between 10 torr and 700 torr or, more narrowly, to between 250 torr and 450 torr. The vacuum conduit 104 may also fluidly communicate with an exhaust conduit 106 so that any gaseous compounds removed from the head space 90 of the interior fining chamber 82 can be directed away from the fining tank 18 for appropriate downstream management.

The one or more induction heating coils 74 surround the interior fining chamber 82 of the fining tank 18. The induction heating coil(s) 74 may extend from the bottom wall 86 of the housing 80 up to at least the top surface 78 of the molten glass bath 76 along the long centerline $L_C$ of the housing 80 to span the full depth D of the molten glass bath 76. The induction heating coil(s) 74 may be embedded, either fully or partially, in the housing 80 of the fining tank 18, or the coil(s) 74 may be disposed around the outside of the housing 80 as shown in FIGS. 1 and 4 either in contact with or spaced outwardly from the housing 80 while maintaining the capability to induce inductive heating in the molten glass bath 76. Each of the one or more inducting heating coils 74 may be an electromagnetic coil, which is typically composed of copper, and may include anywhere from one to twenty-five windings with each full revolution of the electromagnetic coil around the interior fining chamber 82 constituting a single winding. A controllable RF power supply 108 or other suitable power source is electrically connected to the induction heating coil(s) 74 and is configured to deliver a high-frequency AC current through the coil(s) 74. The controlled passage of the high-frequency AC current creates an alternating magnetic field that penetrates the housing 80 of the fining tank 18 and generates eddy currents within the molten glass bath 76 that ultimately heat the glass bath 76. The induction heating coil(s) 74, when activated, can be controlled to heat the molten glass bath 76 to a temperature that ranges from 1250° C. to 1650° C. or, more narrowly, from 1350° C. to 1550° C.

The thermal conditioning tank 16 is separated from the fining tank 18 by the open space 26 and includes a housing 110 that defines a conditioning chamber 112. The housing 110 of the thermal conditioning tank 16 is an elongated structure—such as a forehearth—that defines an inlet 114 and an outlet 116. Fined molten glass is received into the conditioning chamber 112 from the fining tank 18 and is introduced into a flowing molten glass bath 118 that is held within the conditioning chamber 112. The flowing molten glass bath 118 flows along a flow direction F from the inlet 114 to the outlet 116 of the tank 16. A plurality of non-submerged burners 120 are mounted in the housing 110 of the conditioning tank 16. These burners 120 are fed with a gas mixture of a fuel and an oxidant and discharge a flame into an open combustion zone 122 within the conditioning chamber 112 above the flowing molten glass bath 118. The non-submerged burners 120 are operated to condition the molten glass; that is, to gradually reduce the temperature of the flowing molten glass bath 118 along the flow direction F to homogenize the temperature of the glass and bring the glass to a temperature in which the glass viscosity is appropriate for downstream glass forming operations. For glass-container forming operations, the molten glass is typically decreased to a homogenized temperature ranging from between 1050° C. to 1200° C. for soda-lime-silica glass within the conditioning chamber 112. At the outlet 116, the output 28 of conditioned molten glass is removed or pulled from the conditioning chamber 112.

The glass-producing system 12 described above can produce glass while occupying a more compact industrial footprint than a conventional system containing a conventional melting furnace would otherwise occupy for a given glass production rate. Referring now more specifically to FIGS. 1-2 and 4, a method of producing and fining glass is described in the context of melt-reacting, fining, and conditioning soda-lime-silica glass, although it should be appreciated that the same methodology may be applied to other glass chemistries as well. During operation of the SC melter 14, each of the one or more submerged burners 64 individually discharges combustion products 70 directly into and through the glass melt 38. The glass melt 38 is a volume of unfined molten glass that often weighs between 1 US ton (1 US ton=2,000 lbs) and 100 US tons and is generally maintained at a constant volume during steady-state operation of the SC melter 14. As the combustion products 70 are thrust into and through the glass melt 38, which in turn creates complex flow patterns and severe turbulence, the glass melt 38 is vigorously agitated and experiences rapid heat transfer and intense shearing forces. The combustion products 70 eventually escape the glass melt 38 and are removed from the interior reaction chamber 36 through the exhaust vent 54 along with any other gaseous compounds that may volatize out of the glass melt 38. Additionally, in some circumstances, one or more non-submerged burners (not shown) may be mounted in the roof 40 and/or the surrounding upstanding wall 44 at a location above the glass melt 38 to provide heat to the glass melt 38, either directly by flame impingement or indirectly through radiant heat transfer, and to also suppress or destroy foam.

While the one or more submerged burners 64 are being fired into the glass melt 38, the vitrifiable feedstock material 30 is controllably introduced into the interior reaction chamber 36 through the feed material inlet 50. The vitrifiable feedstock material 30 does not form a batch blanket that rests on top of the glass melt 38, but, rather, is rapidly disbanded and consumed by the agitated glass melt 38. The dispersed vitrifiable feedstock material 30 is subjected to intense heat transfer and rapid particle dissolution throughout the glass melt 38 due to the vigorous melt agitation and shearing forces induced by the submerged burner(s) 64. This causes the vitrifiable feedstock material 30 to quickly mix, react, and become chemically integrated into the glass melt 38. However, the agitation and stirring of the glass melt 38 by the discharged combustion products 70 also promotes bubble formation within the glass melt 38. Consequently, the glass melt 38 is foamy in nature and includes a homogeneous distribution of entrained gas bubbles. The entrained gas bubbles may account for 20 vol % to 60 vol % of the glass melt 38, which renders the density of the glass melt 38 relatively low, typically ranging from 0.75 gm/cm$^3$ to 1.5 gm/cm$^3$, or more narrowly from 0.99 gm/cm$^3$ to 1.3 gm/cm$^3$, for soda-lime-silica glass. The gas bubbles entrained within the glass melt 38 vary in size and may contain any of several gases including $CO_2$, $H_2O$ (vapor), $N_2$, $SO_2$, $CH_4$, CO, and volatile organic compounds (VOCs).

The unfined molten glass 32 discharged from the SC melter 14 and through the molten glass outlet 52 is drawn from the glass melt 38 and is chemically homogenized to the desired glass chemical composition, e.g., a soda-lime-silica glass chemical composition, but with the same relatively low density and entrained volume of gas bubbles as the glass melt 38. The unfined molten glass 32 discharged from the SC melter 14 is the source of the inflow 20 of unfined molten glass received in the fining tank 18. The inflow 20 of unfined molten glass is introduced into the interior refining chamber 82 of the fining tank 18 through the inlet 92 defined in the housing 80 of the tank 18 and, preferably, is introduced directly into the upper half 76a of the molten glass bath 76 at a level below the top surface 78 of the molten glass bath 76, as discussed above. Moreover, to assist fining of the glass contained in the molten glass bath 76, the absolute pressure of the interior fining chamber 82 is maintained at a subatmospheric level that ranges from 10 torr to 700 torr (or more narrowly from 250 torr to 450 torr) by operation of the vacuum source 72, and the temperature of the molten glass bath 76 is maintained at a temperature that ranges from 1250° C. to 1650° C. (or more narrowly from 1350 C° to 1550° C.) by controlling the one or more induction heating coils 74 that surround the interior fining chamber 82 of the fining tank 18. The molten glass bath 76 may be maintained at a uniform temperature in that the temperature of the glass bath 76 fluctuates by less than 5° C. or, more narrowly, by less than 3° C., or a temperature profile may be maintained within the molten glass bath 76 as described in more detail below.

The vertically-elongated and upright construction of the housing 80 of the fining tank 18, the subatmospheric pressure of the interior fining chamber 82, and the maintained temperature of the molten glass bath 76 all contribute to the glass fining process that proceeds within the fining tank 18. When the inflow 20 of unfined molten glass is introduced into the interior fining chamber 82 and assimilates into the molten glass bath 76, the entrained gas bubbles B carried within the unfined molten glass naturally begin to rise towards the top surface 78 of the bath 76 when the buoyancy forces acting on the gas bubbles B overcome the competing forces that drag down the gas bubbles B. When the gas bubbles B reach the top surface 78 of the molten glass bath 76, the gas bubbles B burst and release their gases into the head space 90 of the interior fining chamber 82 above the glass bath 76.

By employing the vertically-elongated housing 80, the gas bubbles B are guided upwards and more space exists for higher-density molten glass to sink and gravitationally separate from lower-density unfined molten glass within the molten glass bath 76 to provide fined molten glass at the bottom of the interior fining chamber 82. To that end, the molten glass bath 76 exhibits an increasing density gradient down its depth D with a density of the molten glass bath 76 increasing from a first glass density within an uppermost 10% of the depth D ($UD_{10}$ in FIG. 4) of the molten glass bath 76 to a second glass density within a lowermost 10% of the depth D ($LD_{10}$ in FIG. 4) of the molten glass bath 76 that is at least 80% greater than the first glass density. As illustrated in FIG. 4, the uppermost 10% of the depth D of the molten glass bath 76 is a volume of the glass bath 76 that extends from the top surface 78 of the glass bath 76 down to 10% of the depth D of the molten glass bath 76 below the top surface 78, and the lowermost 10% of the depth D of the molten glass bath 76 is a volume of the glass bath 76 that extends from the bottom wall 86 of the housing 80 to 10% of the depth D of the molten glass bath 76 above the bottom wall 86. For soda-lime-silica glass, for example, the first glass density within the uppermost 10% of the depth D of the molten glass bath 76 typically ranges from 0.75 gm/cm$^3$ to 1.5 gm/cm$^3$, or more narrowly from 0.99 gm/cm$^3$ to 1.3 gm/cm$^3$, and the second glass density within the lowermost 10% of the depth D of the molten glass bath 76 typically ranges from 2.3 gm/cm$^3$ to 2.5 gm/cm$^3$.

The rate or velocity at which the gas bubbles B ascend upwards through the molten glass bath 76 is increased by the subatmospheric pressure of the interior fining chamber 82 and the temperature maintained in the molten glass bath 76 compared to glass at standard atmospheric pressure and a temperature that is the same or lower. This can be ascertained from Stokes Law (Equation 1 below), $$v = \frac{c\rho g R^2}{\eta} \qquad \text{(Eq. 1)}$$

wherein (v) is the rise or ascension velocity (relative to the glass bath) of a bubble [m/s]; (c) is a correction factor ranging from 2/9 (rigid bubble surface) to 1/3 (mobile bubble surface); ($\rho$) is the density of the molten glass bath [kg/m$^3$]; (g) is the acceleration of gravity [9.8 m/s$^2$]; R is the bubble radius [m]; and $\eta$ is the viscosity of the molten glass bath [Pa·s]. As can be seen, increasing the temperature of the molten glass bath 76 to lower the viscosity ($\eta$) of the glass therein has the effect of increasing the velocity (v) at which the entrained gas bubbles B ascend through the glass since glass viscosity and gas bubble rise velocity are inversely proportional. Moreover, increasing the temperature of the molten glass bath 76 and lowering the pressure of the interior fining chamber 82 upsets the gas-phase-melt-phase equilibrium of gases dissolved in the glass matrix and causes degassing (i.e., the release of dissolved gases). The released gases diffuse into and enlarge other gas bubbles B, which in turn increases the bubble rise velocity of those bubbles since the bubble rise velocity is proportional to the square of bubble radius (R).

As the entrained gas bubbles B rise through the molten glass bath 76 with assistance from the configuration of the fining tank 18 and the operation of the fining apparatus 10, higher-density fined glass that satisfies an applicable standard that meets a customer or consumer specification or an internal manufacturing objective collects at the bottom of the interior fining chamber 82 adjacent to the bottom wall 86 of the housing 80. The fined molten glass may account for some or all of the lowermost 10% of the depth D ($LD_{10}$ in FIG. 4) of the molten glass bath 76 and may even account for up to the lowermost 25% of the depth D of the molten glass bath 76. While exactly what constitutes fined molten glass depends on a variety of factors including the particular chemistry of the glass and the intended end-use of the glass, a standard that applies to soda-lime-silica glass produced for hollow containers and flat glass articles such as windows may call for a bubble count of zero blisters (i.e., gas bubbles having a diameter of 0.8 mm or greater) and less than 0.5 seeds (i.e., gas bubbles having a diameter of less than 0.8 mm) per gram of glass. When this is the case, the glass density of the glass ranges from 2.3 $gm/cm^3$ to 2.5 $gm/cm^3$ and the volume of entrained gas bubbles within the glass may range from 0 vol % to 0.1 vol % or, more narrowly, from 0 vol % to 0.05 vol %.

The outflow 22 of fined molten glass is drawn from the molten glass bath 76 and discharged from the fining tank 18 through the outlet 94 of the housing 80. As described above, the outflow 22 of fined molten glass is supplied as one or more, and preferably one to five, discrete streams 22' of fined molten glass depending on the number of operational discharge openings 100 defined in the orifice plate 102. The outflow 22 of fined molten glass falls through the ambient environment 24 that occupies the open space 26 between the fining tank 18 and the thermal conditioning tank 16. The ambient environment 24 may be atmospheric air or another gaseous medium, such as nitrogen or argon, and may have a temperature that ranges from 15° C. to 35° C. The ambient environment 24 may also be stagnant or flowing such as, for example, when a fan is impelling the atmospheric gaseous medium through the open space 26 between the fining tank 18 and the thermal conditioning tank 16. When the outflow 22 of fined molten glass is exposed to the ambient environment 24 prior to entering the thermal conditioning tank 16, the fined molten glass cools rapidly from a temperature of 1250° C. to 1650° C., or more narrowly from 1350° C. to 1550° C., which is the temperature the fined molten glass has within the molten glass bath 76 held in the fining tank 18, to a pre-conditioning temperature. The pre-conditioning temperature attained in the ambient environment 24 depends on the distance between the outlet 94 of the fining tank 18 and the inlet 114 of the thermal conditioning tank 16 and preferably ranges from 1200 C° to 1350° C. or, more narrowly, from 1250° C. to 1300° C.

The outflow 22 of fined molten glass is received in the thermal conditioning tank 16 after its temperature has been reduced to the pre-conditioning temperature in the ambient environment 24 through which it fell by the force of gravity. The outflow 22 of fined molten glass is received through the inlet 114 of the housing 110 of the thermal conditioning tank 16 and into the conditioning chamber 112. There, the outflow 22 of fined molten glass combines with and is subsumed by the flowing molten glass bath 118 held within the conditioning chamber 112 in a flowable state. The flowing molten glass bath 118 flows through the conditioning chamber 112 from the inlet 114 to the outlet 116 of the housing 110 along the flow direction F while its temperature is homogenized and steadily reduced from the pre-conditioning temperature at which the outflow 22 of fined molten glass enters the conditioning chamber 112 to a forming temperature. The forming temperature is selected to provide the molten glass with a glass viscosity that is appropriate for downstream forming operations and, for soda-lime-silica glass, may range from 1050° C. to 1200° C., as noted above, to provide a glass viscosity of between $10^3$ Pa·s and $10^4$ Pa·s. Upon achieving the forming temperature downstream of the inlet 114, the flowing molten glass bath 118 is comprised of conditioned molten glass. The outflow 28 of conditioned molten glass is drawn or pulled from this portion of the flowing molten glass bath 118 through the outlet 116 of the housing 110 of the thermal conditioning tank 16 and is supplied to forming equipment such as, for example, a glass container forming machine having a blank mold and a blow mold.

Figure 5:
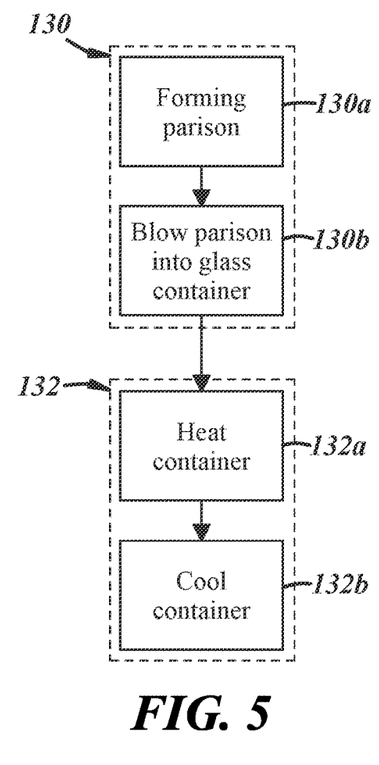
FIG. 5 is a flow-chart illustrating a process by which conditioned molten glass may be formed into glass containers according to one embodiment of the present disclosure.

Glass containers may be formed from conditioned molten glass obtained from the outflow 28 of conditioned molten glass in a forming step 130 as shown in the flow diagram of FIG. 5. In some standard container-forming processes, the outflow 28 of conditioned molten glass may be discharged from a spout appended to the thermal conditioning tank 16 as conditioned molten glass streams or runners. The conditioned molten glass runners are then sheared into individual gobs of a predetermined weight. Each gob is delivered via a gob delivery system into a blank mold of a glass container forming machine. In other glass container forming processes, however, the outflow 28 of conditioned molten glass may be streamed directly from the outlet 116 of the thermal conditioning tank 16 into the blank mold to fill the mold with glass. Once in the blank mold, and with its temperature still between 1050° C. and 1200° C., the conditioned molten glass is pressed or blown in substep 130a into a parison or preform that includes a tubular wall. The parison is then transferred from the blank mold into a blow mold of the glass container forming machine. Once the parison is received in the blow mold, the blow mold is closed and the parison is rapidly outwardly blown in substep 130b into the final container shape that matches the contour of the mold cavity using a compressed gas such as compressed air. Other approaches may of course be implemented to form the glass containers besides the press-and-blow and blow-and-blow forming techniques including, for instance, compression or other molding techniques.

The glass container formed within the blow mold has an axially closed base and a circumferential wall. The circumferential wall extends from the axially closed base to a mouth that defines an opening to a containment space defined by the axially closed base and the circumferential wall. The glass container is allowed to cool while in contact with the mold walls of the blow mold and is then removed from the blow mold and placed on a conveyor or other transport device. The glass container is then reheated and cooled at a controlled rate in an annealing lehr to relax thermally-induced strain and remove internal stress points in step 132. The annealing of the glass container involves heating the glass container in substep 132a to a temperature above the annealing point of the soda-lime-silica glass chemical composition, which usually lies within the range of 510° C. to 550° C., followed by slowly cooling the container in substep 132b at a rate of 1° C./min to 10° C./min to a temperature below the strain point of the soda-lime-silica glass chemical composition, which usually lies within the range of 470° C. to 500° C. The glass container may be cooled rapidly after it has been cooled to a temperature below the strain point. Moreover, any of a variety of coatings may be applied to the surface of the glass container either before (hot-end coatings) or after (cold-end coatings) annealing for any of a variety of reasons.

The fining apparatus 10 described above in connection with FIGS. 1-4 may be structurally modified without losing its capacity to fine glass as described above. Several examples of such modifications are illustrated as part of the fining apparatus shown in FIG. 6. There, the fining apparatus is identified by reference numeral 1010. All other elements of the fining apparatus 1010 and the rest of the glass-producing system that are identified with a 1000 series reference numeral are meant to embody the teachings and disclosure set forth above for the counterpart elements depicted in FIGS. 1-4 that are identified with like reference numerals. In other words, the teachings and descriptions set forth above for the various elements of the fining apparatus 10 and the rest of the glass-producing system 12 depicted in FIGS. 1-4 apply equally to the counterpart elements shown in FIG. 6, which are identified with corresponding 1000 series reference numerals, unless specifically stated otherwise below.

Figure 6:
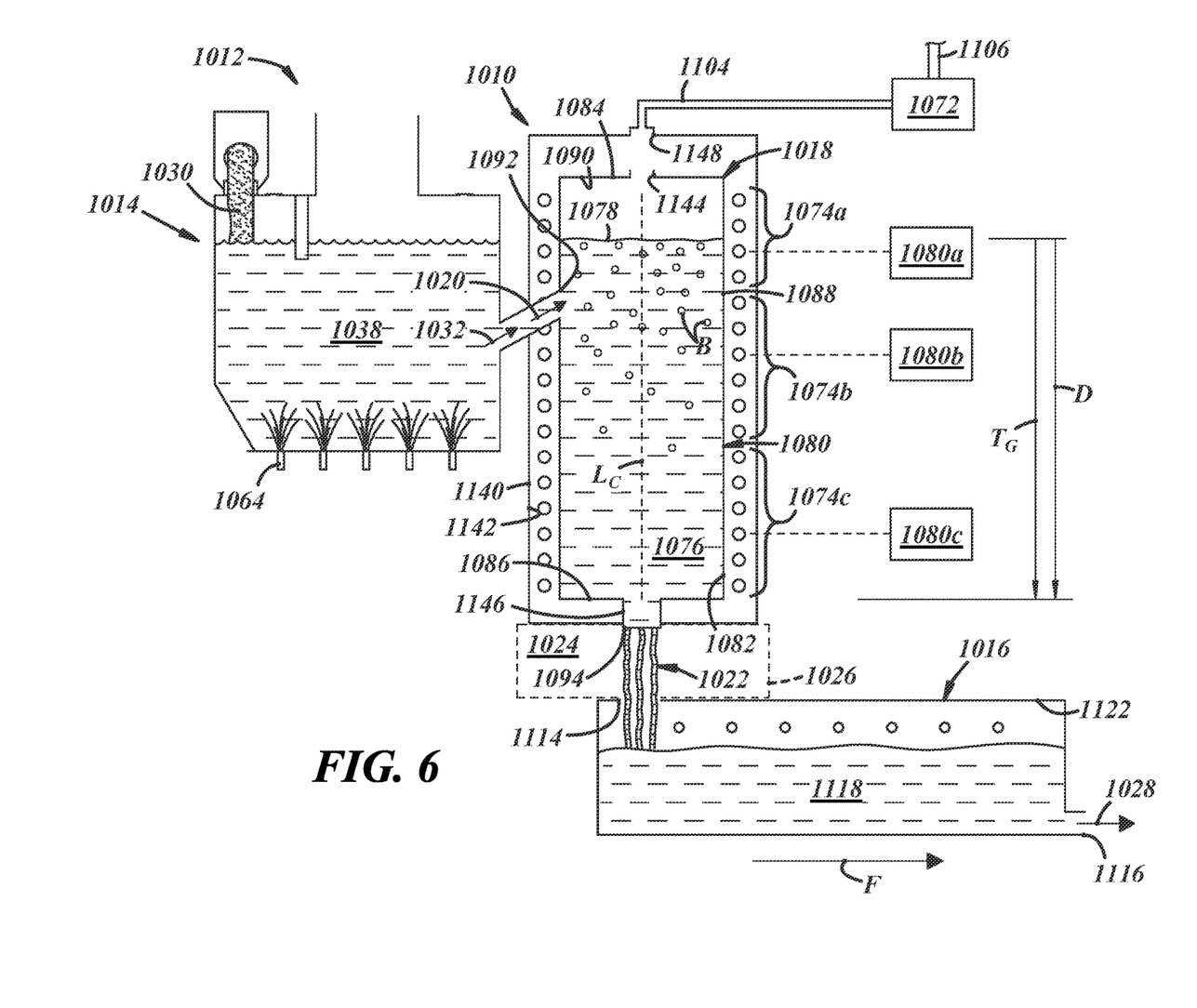
FIG. 6 is an elevated cross-sectional representation of a glass-producing system that includes a submerged combustion melter, a fining apparatus that includes a vacuum induction fining tank, and a thermal conditioning tank according to another embodiment of the present disclosure.

One possible variation embodied in the fining apparatus 1010 shown in FIG. 6 is the addition of a pressure shell 1140 that surrounds and encloses the fining tank 1018 and the one or more induction heating coils 1074. The pressure shell 1140 defines an interior containment chamber 1142. The fining tank 1018 is disposed within the interior containment chamber 1142 and, as shown, the housing 1080 of the fining tank 1018 may define an open passage 1144 in place of the vacuum port 96 of the embodiment shown in FIGS. 1 and 4. The open passage 1144 establishes fluid communication between the head space 1090 of the interior fining chamber 1082 of the fining tank 1018 and the interior containment chamber 1142 that envelopes the fining tank 1018. This allows the pressure of the interior fining chamber 1082 to be controlled by the pressure of the interior containment chamber 1142. Additionally, to help discharge the outflow 1022 of fined molten glass from the fining tank 1018 and deliver it to the thermal conditioning tank 1016, an extension conduit 1146 may extend from the bottom wall 1086 of the housing 1080 and through the pressure shell 1140. The extension conduit 1146 may be integral with the housing 1080, or it may be a separate tube or pipe that is coupled to the housing 1080, and it surrounds the outlet 1094 of the of the fining tank 1018 and isolates the outlet 1094 from the interior containment chamber 1142.

The pressure shell 1140 provides an alternate way to control the pressure in the interior fining chamber 1082 of the fining tank 1018. To that end, a vacuum port 1148 is defined in the pressure shell 1140. The vacuum port 1148 fluidly communicates with the interior containment chamber 1142 and is connected to the vacuum source 1072 by the vacuum conduit 1104. The vacuum source 1072 operates to reduce the pressure within the interior containment chamber 1142 to a subatmospheric level that, similar to before, may range from 10 torr to 700 torr (absolute pressure) or, more narrowly, from 250 torr to 450 torr, which in turn reduces the pressure within the interior fining chamber 1082, and in particular the head space 1090 to the same subatmospheric level. Also, and similar to before, the vacuum conduit 1104 may fluidly communicate with the exhaust conduit 1106 to remove gaseous compounds from the interior containment chamber 1142 and away from the fining tank 1018 for appropriate downstream management. The pressure shell 1140 is relatively easy to seal and the pressure within the interior containment chamber 1142 is relatively easy to maintain, which makes the use of the pressure shell 1140 a viable option within the fining apparatus 1010. Apart from the manner in which the subatmospheric pressure in the interior fining chamber 1082 of the fining tank 1018 is attained and controlled, the fining apparatus described here and shown in FIG. 6 functions in the same way as the fining apparatus described earlier and shown in FIGS. 1 and 4.

Another possible variation embodied in the fining apparatus 1010 shown in FIG. 6 is the implementation of a plurality of sets of one or more induction heating coils 1074 arranged serially along the long centerline $L_C$ of the housing 1080. Each set of induction heating coil(s) 1074 is distinct and electrically isolated from each of the other sets of induction heating coil(s) 1074. This allows each set of induction heating coil(s) 1074 to be independently supplied with a high-frequency AC current from an associated controllable RF power supply 1080 and separately controlled. While the exact number of sets of induction heating coil(s) 1074 present in the fining apparatus 1010 of this embodiment is somewhat flexible, a typical construction of the apparatus 1010 usually includes between two and five sets of induction heating coil(s) 1074. Indeed, as shown here in an example construction, the plurality of sets of induction heating coil(s)s 1074 includes a first set of one or more induction heating coils 1074a, a second set of one or more induction heating coil 1074b, and a third set of one or more induction heating coil 1074c as positioned serially, in that order, along the long centerline $L_C$ of the housing 1080 between the top wall 1084 and the bottom wall 1086 of the housing 1080 while spanning the full depth D of the molten glass path 1076. The first, second, and third sets of induction heating coil(s) 1074a, 1074b, 1074c are electrically connected to a first RF power supply 1080a, a second RF power supply 1080b, and a third RF power supply 1080c, respectively, to permit individual activation and control of the sets of induction heating coil(s) 1074a, 1074b, 1074c.

The plurality of sets of induction heating coil(s) 1074 allow the molten glass bath 1076 to be heated unevenly; that is, the heat input from each of the sets of induction heating coil(s) 1074 may be different to establish a temperature gradient $T_G$ within the molten glass bath 1076. The temperature gradient $T_G$ may be controlled to optimize the release of entrained gas bubbles B from the molten glass bath 1076 into the head space 1090 of the interior fining chamber 1082 to help speed the overall fining operation. For example, as shown here in FIG. 6, the temperature gradient $T_G$ established by the sets of induction heating coils(s) 1074 may cause the temperature of the molten glass bath 1076 to increase along the depth D of the glass bath 1076 (i.e., the temperature of the molten glass bath 1076 increases as a distance into the molten glass bath 1076 away from the top surface 1078 of the glass bath 1076 increases). The glass temperature difference within the molten glass bath 1076 as a result of the established temperature gradient $T_G$ may range from 5° C. to 200° C. while each of a lowest temperature and a highest temperature of the glass bath 1076 lies between 1250° C. and 1650° C., or more narrowly, between 1350° C. and 1550° C. or even between 1400° C. and 1500° C. In one particularly preferred implementation, the sets of one or more induction heating coil(s) 1074, when activated, can heat the molten glass bath 1076 such that a temperature within the uppermost 10% of the depth D ($UD_{10}$) (FIG. 4) of the molten glass bath 1076 ranges from 1250° C. to 1500° C. and a temperature within the lowermost 10% of the depth D ($LD_{10}$) (FIG. 4) of the molten glass bath 1076 ranges from 1300° C. to 1650° C. The plurality of sets of induction heating coil(s) 1074 may also be used in other embodiments to evenly heat the molten glass bath 1076.

The establishment of the temperature gradient $T_G$ in which the temperature of the molten glass bath 1076 increases with the depth D of the glass bath 1076 generally enhances the velocity at which the entrained gas bubbles B—and, in particular, the more difficult to remove smaller gas bubbles that have managed to sink within the glass bath 1076—ascend upwardly through the molten glass bath 1076 towards the top surface 1078 of the glass bath 1076. By assisting the removal of the smaller entrained gas bubbles B with the temperature gradient $T_G$, the residence time for molten glass within the fining tank 1080 as part of the molten glass bath 1076 can be minimized. Moreover, the additional heat applied to the fined molten glass within the fining tank 1080 as a result of the temperature gradient $T_G$ will not substantially affect the time and/or energy input needed to thermally condition the fined molten glass in the downstream thermal conditioning tank 1016. This is because any additional heat carried by the outflow 1022 of fined molten glass exiting the fining tank 1018 is jettisoned to the ambient environment 1024 as the outflow 1022 of fined molten glass passes through the open space 1026 that exists between the fining tank 1080 and the thermal conditioning tank 1016.

There thus has been disclosed a fining apparatus, a glass producing system that includes the fining apparatus, and a method for fining SC-produced glass or other comparatively foamy molten glass that satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of producing glass, the method comprising:
   producing a volume of unfined molten glass that comprises at least 20 vol % of entrained gas bubbles;
   receiving an inflow of unfined molten glass from the volume of unfined molten glass and introducing the inflow of unfined molten glass into a fining tank that holds a molten glass bath, the fining tank having a housing that defines an interior fining chamber in which the molten glass bath is contained, the housing of the fining tank having a height and a width, with the height of the housing being greater than the width of the housing, the inflow of unfined molten glass combining with the molten glass bath in the interior fining chamber of the fining tank;
   maintaining the interior fining chamber of the fining tank at a subatmospheric pressure;
   inductively heating the molten glass bath contained within the fining tank to maintain the molten glass bath within a temperature range for glass fining;
   discharging an outflow of fined molten glass from the fining tank, the outflow of fined molten glass being drawn from the molten glass bath and having a lower volume percentage of entrained gas bubbles and a higher density than the inflow of unfined molten glass received into the fining tank;
   passing the outflow of fined molten glass through an ambient environment as the outflow of fined molten glass falls from the fining tank into a thermal conditioning tank through an open space that separates the fining tank and the thermal conditioning tank, the outflow of fined molten glass cooling down when exposed to the ambient environment;
   introducing the outflow of fined molten glass into the thermal conditioning tank in which the outflow of fined molten glass combines with a flowing molten glass bath held within a conditioning chamber of the thermal conditioning tank; and
   discharging an output of conditioned molten glass from the thermal conditioning tank, the output of conditioned molten glass having a temperature that is less than a temperature of the outflow of fined molten glass introduced into the thermal conditioning tank.

2. The method set forth in claim 1, wherein producing unfined molten glass comprises:
   introducing a vitrifiable feedstock material into an interior reaction chamber of a submerged combustion melter that holds a glass melt comprising the volume of unfined molten glass; and
   discharging combustion products from one or more submerged combustion melters directly into the glass melt held to heat and agitate the glass melt as the vitrifiable feedstock material melt-reacts within the glass melt to form unfined molten glass.

3. The method set forth in claim 1, wherein the volume of unfined molten glass that is produced has a soda-lime-silica glass chemical composition comprising 60 wt % to 80 wt % $SiO_2$, 8 wt % to 18 wt % $Na_2O$, and 5 wt % to 15 wt % CaO.

4. The method set forth in claim 3, wherein the inflow of unfined molten glass comprises 30 vol % to 60 vol % of entrained gas bubbles and has a density of 0.75 gm/cm3 to 1.5 gm/cm3, and wherein the outflow of fined molten glass comprises 0 vol % to 0.1 vol % of entrained gas bubbles and has a density of 2.3 gm/cm3 to 2.5 gm/cm3.

5. The method set forth in claim 1, wherein the outflow of fined molten glass includes one or more discrete streams of fined molten glass.

6. The method set forth in claim 5, wherein the outflow of fined molten glass includes three to five discrete streams of fined molten glass.

7. The method set forth in claim 1, wherein the molten glass bath held within the interior fining chamber of the fining tank is maintained at a uniform temperature.

8. The method set forth in claim 1, wherein a temperature gradient is established within the molten glass bath held within the interior fining chamber of the fining tank such that the temperature of the molten glass bath increases along a depth of the molten glass bath.

9. The method set forth in claim 1, wherein the fining tank is surrounded by a pressure shell that defines an interior containment chamber, the interior containment chamber fluidly communicating with the interior fining chamber of the fining tank located therein, and wherein maintaining the subatmospheric pressure of the interior fining chamber comprises maintaining the interior containment chamber at a subatmospheric pressure.

10. The method set forth in claim 1, wherein the outflow of fined molten glass is drawn from a lowermost 25% of the depth of the molten glass bath held within the interior fining chamber of the fining tank.

11. A method of producing glass, the method comprising:
   producing a volume of unfined molten glass in a submerged combustion melter which includes discharging combustion products from one or more submerged burners directly into a glass melt held within an interior reaction chamber of the submerged combustion melter;

receiving an inflow of unfined molten glass from the submerged combustion melter and introducing the inflow of unfined molten glass into a fining tank that holds a molten glass bath having a depth, the fining tank having a vertically-elongated housing that defines an interior fining chamber in which the molten glass bath is contained, the housing of the fining tank having a height and a width, with the height of the housing being greater than the width of the housing, the inflow of unfined molten glass combining with the molten glass bath in the interior fining chamber of the fining tank;

maintaining the interior fining chamber of the fining tank at a subatmospheric pressure; inductively heating the molten glass bath contained within the fining tank to maintain the molten glass bath at a temperature ranging from 1250° C. to 1650° C.;

discharging an outflow of fined molten glass from the fining tank, the outflow of fined molten glass being drawn from the molten glass bath and having a lower volume percentage of entrained gas bubbles and a higher density than the inflow of unfined molten glass received into the fining tank, the outflow of fined molten glass being in the form of a plurality of discrete streams of fined molten glass;

passing the outflow of fined molten glass through an ambient environment as the outflow of fined molten glass falls from the fining tank into a thermal conditioning tank through an open space that separates the fining tank and the thermal conditioning tank, the outflow of fined molten glass cooling down when exposed to the ambient environment; and introducing the outflow of fined molten glass into the thermal conditioning tank in which the outflow of fined molten glass combines with a flowing molten glass bath held within a conditioning chamber of the thermal conditioning tank.

12. The method set forth in claim 11, further comprising:

discharging an output of conditioned molten glass from the thermal conditioning tank, the output of conditioned molten glass having a temperature that is less than a temperature of the outflow of fined molten glass introduced into the thermal conditioning tank.

13. The method set forth in claim 11, wherein inductively heating the molten glass bath held within the interior fining chamber comprises:

controlling one or more induction heating coils that surround the interior fining chamber to maintain the molten glass bath held within the interior fining chamber at a uniform temperature.

14. The method set forth in claim 11, wherein inductively heating the molten glass bath held within the interior fining chamber comprises:

separately controlling a plurality of sets of one or more induction heating coils arranged serially around the interior fining chamber of the fining tank to establish a temperature gradient within the molten glass bath held within the interior finning chamber of the fining tank such that the temperature of the molten glass bath increases along a depth of the molten glass bath.

15. The method set forth in claim 11, wherein the fining tank is surrounded by a pressure shell that defines an interior containment chamber, the interior containment chamber fluidly communicating with the interior fining chamber of the fining tank located therein, and wherein maintaining the subatmospheric pressure of the interior fining chamber comprises maintaining the interior containment chamber at a subatmospheric pressure.

16. The method set forth in claim 11, wherein the volume of unfined molten glass that is produced has a soda-lime-silica glass chemical composition comprising 60 wt % to 80 wt % $SiO_2$, 8 wt % to 18 wt % $Na_2O$, and 5 wt % to 15 wt % CaO, and wherein the inflow of unfined molten glass comprises 20 vol % to 60 vol % of entrained gas bubbles and has a density of 0.75 gm/cm$^3$ to 1.5 gm/cm$^3$ while the outflow of fined molten glass comprises 0 vol % to 0.1 vol % of entrained gas bubbles and has a density of 2.3 gm/cm$^3$ to 2.5 gm/cm$^3$.

* * * * *